United States Patent [19]

Winter

[11] 4,336,159
[45] Jun. 22, 1982

[54] METHOD AND ARRANGEMENT FOR THE THERMAL REGENERATION OF CHARGED ADSORPTION MATERIALS

[75] Inventor: Karl Winter, Dortmund, Fed. Rep. of Germany

[73] Assignee: CEAG Verfahrenstechnik GmbH, Selm, Fed. Rep. of Germany

[21] Appl. No.: 186,285

[22] Filed: Sep. 11, 1980

[30] Foreign Application Priority Data

Sep. 12, 1979 [DE] Fed. Rep. of Germany ....... 2936873
Dec. 22, 1979 [DE] Fed. Rep. of Germany ....... 2952127
Mar. 1, 1980 [DE] Fed. Rep. of Germany ....... 3007928

[51] Int. Cl.³ .................... B01D 53/04; B01J 20/34
[52] U.S. Cl. .................... 252/411 R; 55/62; 55/74; 55/27
[58] Field of Search ........... 55/31, 33, 58, 59, 62, 55/179, 208, 27, 74; 252/411R

[56] References Cited

U.S. PATENT DOCUMENTS

| | | | |
|---|---|---|---|
| 2,675,089 | 4/1954 | Kahle | 55/62 |
| 2,790,505 | 4/1957 | Dow | 55/179 X |
| 3,230,689 | 1/1966 | Hussmann | 55/179 X |
| 3,674,429 | 7/1972 | Collins | 55/31 X |
| 3,850,592 | 11/1974 | Huffman | 55/208 X |
| 3,891,410 | 6/1975 | Hankison | 55/179 X |
| 3,902,874 | 9/1975 | McAndrew | 55/74 |
| 4,030,896 | 6/1977 | Wimber et al. | 55/62 X |
| 4,165,972 | 8/1979 | Iles et al. | 55/208 X |
| 4,185,969 | 1/1980 | Bulang | 55/208 X |
| 4,219,341 | 8/1980 | Hussmann | 55/179 |

FOREIGN PATENT DOCUMENTS

| | | |
|---|---|---|
| 704350 | 3/1941 | Fed. Rep. of Germany . |
| 2631225 | 1/1978 | Fed. Rep. of Germany . |
| 54-109667 | 8/1979 | Japan ...................................... 55/208 |

*Primary Examiner*—Robert H. Spitzer
*Attorney, Agent, or Firm*—Herbert L. Lerner; Laurence A. Greenberg

[57] ABSTRACT

Thermal regeneration of charged solid adsorption material by passing a heated gaseous regeneration medium therethrough. Regeneration is combined with a heat pump in which a cooling medium flows in a cooling medium circuit by propelling means which directs the cooling medium in heated condition to a condenser of a first heat exchanger of the heat pump and then to a vaporizer of a second heat exchanger of the heat pump. The gaseous regeneration medium is heated prior to entrance to the adsorption material by passing it through the first heat exchanger, and the discharged regeneration medium and desorbate are cooled by passing through the second heat exchanger.

16 Claims, 6 Drawing Figures

METHOD AND ARRANGEMENT FOR THE THERMAL REGENERATION OF CHARGED ADSORPTION MATERIALS

BACKGROUND OF THE INVENTION

1. Field of the Invention

The invention relates to a method for the thermal regeneration of charged adsorption materials by means of a gaseous regeneration medium.

2. Description of the Prior Art

Various adsorption materials as for example, activated carbon, activated clay, and molecular filters are used for gas- and liquid purification, and thereby become charged with the adsorbed impurities. These charged adsorption materials can be thermally regenerated. For this purpose a gaseous regeneration medium is heated, and conducted through the adsorption material. Water vapor or gases which are inert with respect to the adsorption materials and their impurities, and often have a low oxygen content are frequently used as the regeneration medium. The regeneration medium leaving the adsorption material layer contains the expelled impurities in vapor form. These substances, mostly of organic nature, can be separated from the regeneration medium by cooling and condensation. With water vapor as the regeneration medium, these substances together with the water are condensed at the cooling, and the separation of the condensate from the water is performed thereafter.

Considered from an energy point of view, by heating the regeneration medium, energy is put into the system in the order of magnitude of the adsorption heat for effecting the desorption, while at cooling, the condensation heat is liberated which together with the sensible heat of the desorption medium is given off to the environment through the cooling media of air or water. Thereby, water-vapor regeneration operates especially disadvantageously, because here the large condensation heat of the water vapor is lost.

According to the German Published Non-Prosecuted Application OS 26 31 255, it is proposed as an improvement with respect to energy in regeneration with water vapor, to use a part of the condensation heat of the regeneration steam for producing fresh regeneration vapor. In spite of some improvement, the energy consumption remains high, as can be learned from the examples given there: Per kilogram of desorbed and condensed impurities, 2.5 kg, respectively, 4.6 kg water vapor are required. Though this is only ⅓ of the conventional amount of water vapor, its condensation heat is lost in addition to the condensation heat of the impurities.

German Patent No. 704,350 describes a method wherein a gaseous desorption medium is conducted in a desorption circuit by a blower, heated in a heater E, and then passed in contact with the used-up adsorption material in the adsorber to renew it. The expelled desorbate is deposited by cooling in a condenser which serves as "desorbate catcher". In order not to lose the total heat contained in the gaseous desorption medium, it is proposed in the patent that this condenser be not passed through by the flow of the gaseous desorption medium, but that the partial pressure of the desorbate be lowered by cooling it in a space which is connected with the desorption circuit, but not passed through by the flow, and thus create a partial pressure, in which the desorbate diffuses for cooling without the gaseous desorption medium losing the sensible heat contained in it. Thereby, the expected saving in heating energy can only occur at the end of the desorption, i.e. when the adsorption layer is fully heated. But since the adsorption material must be cooled after the desorption is finished, the saving of heating energy cannot include the sensible heat stored in the adsorption material.

SUMMARY OF THE INVENTION

An object of the present invention is to provide a method for the regeneration of used adsorption materials with a lower energy consumption to improve the economy of the process. Another object is to reduce the application of driven mechanical construction elements, and thereby to reduce mechanical wear.

A further object of the invention is to provide a method, wherein the heat energy which is stored in the adsorption material during the desorption phase is economically utilized in the process itself, and the loss of the sensible heat of the gaseous desorption medium is minimized during the desorption as well as during the cooling phase, and this heat energy is kept available at least for the beginning of the following desorption. A still further object of the invention is to provide an arrangement in which the method can be advantageously performed, and which can be economically constructed and operated.

With the foregoing and other objects in view, there is provided in accordance with the invention a method for the thermal regeneration of solid adsorption materials charged with adsorbed impurities which comprises passing a heated gaseous regeneration medium through the charged adsorption material to expel the impurities therefrom and discharging regeneration medium containing desorbate from the adsorption material, maintaining a heat pump in which a cooling medium flows in a cooling medium circuit by propelling means which directs said medium in heated condition to a condenser of a first heat exchange of the heat pump wherein the medium is cooled and gives off heat, and the cooled medium then flows to a vaporizer in a second heat exchanger of the heat pump wherein the medium expands and extracts heat, and returning the medium to the propelling means, heating the regeneration medium prior to entrance to the adsorption material by passing it through said first heat exchanger of the heat pump in indirect heat exchange with the cooling medium in said condenser, and cooling said discharged regeneration medium containing desorbate by passing it through said second heat exchanger in indirect heat exchange with the cooling medium in said vaporizer.

Other features which are considered as characteristic for the invention are set forth in the appended claims.

Although the invention is illustrated and described herein as embodied in a method and arrangement for the thermal regeneration of charged adsorption materials, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

According to the invention the regeneration medium is heated by indirect heat exchange with cooling medium in a condenser in a heat exchanger of a heat pump. The hot regeneration medium is conducted through the adsorption material and the regeneration medium with the expelled impurities is cooled by indirect heat exchange with cooling medium in the evaporator of another heat exchanger of the same heat pump. In a preferred construction form, the heat pump employs a compression pump for compressing coolant, with the compressor driven by a combustion engine. Two or more heat pumps with different coolants in known cascade arrangement may be disposed between the heat exchanger of the condenser and the heat exchanger of the evaporator.

The heat pump may be an absorption heat pump with an expeller heated by means of a combustion device. The exhaust gas of the combustion device is, at least partly, used as regeneration medium. In a preferred form, the cycle of the absorption fluid is kept in motion by a vapor bubble pump. The vapor bubble pump has a bubble-forming vessel which can work as the expeller heated by a combustion device.

During the desorption phase the gaseous desorption medium which is cooled by the withdrawal of heat in the adsorption material, flows together with the desorbate to an inititally cold heat-accumulator, which is disposed outside of the adsorption material container. There sensible and latent heat from the desorption medium and desorbate transfers to the heat storage substance and heats the latter. The cooled desorption substance leaving the heat accumulator is heated in a heat exchanger and the hot desorption medium again conducted to the adsorption material. During the cooling phase following the desorption phase, the gaseous desorption material, which is no longer cooled to a great extent by the adsorption material, flows hot to the heat accumulator, and heats the heat storage substance by transfering essentially sensible heat. The gaseous desorption material leaves the heat accumulator in a cooled condition. It is not heated again, and in this cold condition is conducted into the adsorption material container, where the gaseous desorption medium becomes heated by taking heat from the hot adsorption material. The gaseous desorption medium transfers this accepted heat to the heat storage substance. The next desorption cycle is initiated after filling of the desorption circuit with the gaseous desorption medium and after starting the desorption circuit. The gaseous desorption medium is first heated in the now hot heat accumulator, and the gaseous desorption medium is conducted to the adsorption material container. Thereby the heat accumulated in the heat accumulator effects at least the first heating of the adsorption material for initiating the next desorption. In a preferred arrangement, a heat accumulator precedes the heat exchanger in the desorption circuit.

Figure 1:
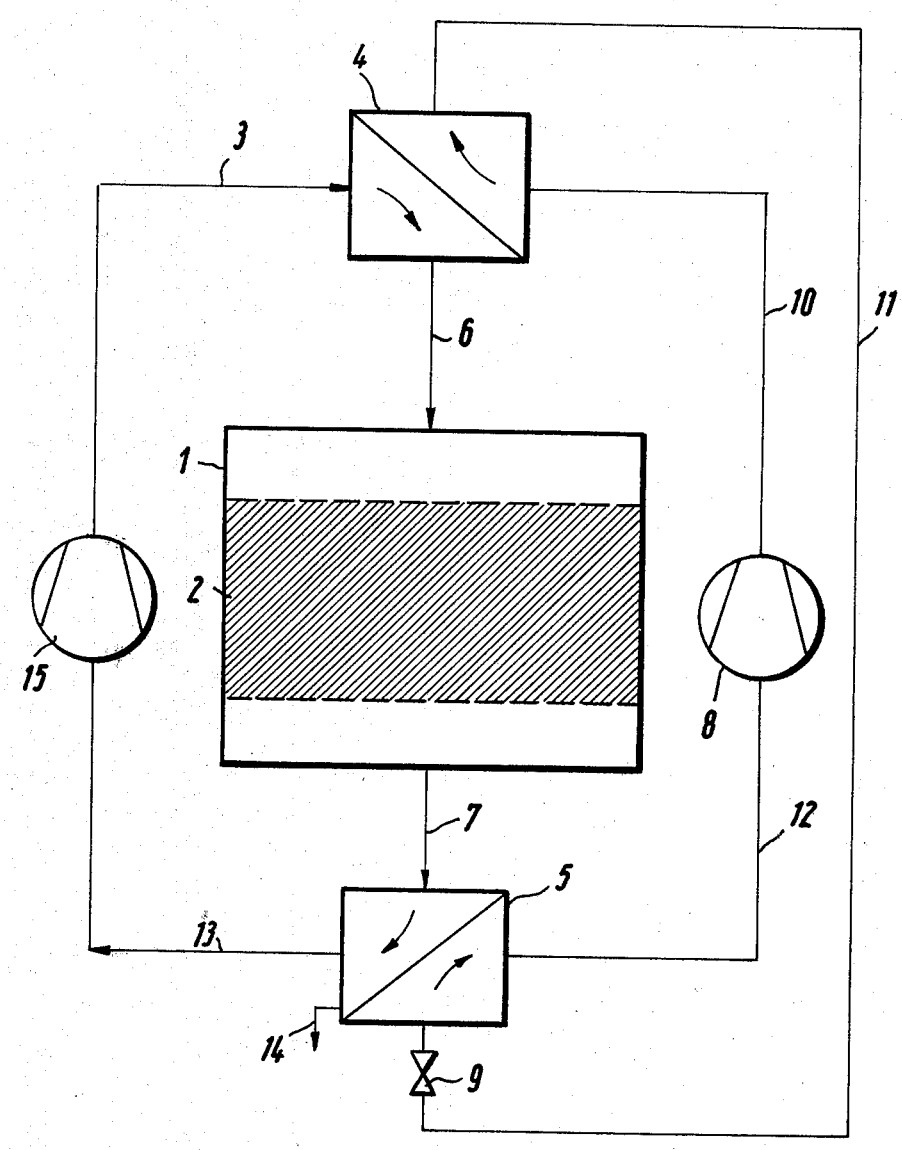
FIG. 1 diagrammatically illustrates a method of the invention for the thermal regeneration of charged adsorption medium by means of a gaseous regeneration medium with a compression-heat pump to heat the incoming regeneration gases and extract heat from the outlet gases.

Referring to FIG. 1, a container 1 contains the adsorption material 2. The regeneration medium enters through line 3 into the condenser of the heat exchanger of the heat pump, is heated there, and conducted by line 6 into the container 1 holding the charged adsorption material 2. The regeneration medium with the expelled impurities in vapor form leaves the container 1 through line 7, and is transported through line 7 into the evaporator 5 of another heat exchanger, in which the regeneration medium and the impurities are cooled, and at least a part of the impurities condensed. The precipitated condensate is withdrawn from the heat exchanger of the evaporator 5 through line 14. The uncondensed substances together with the regeneration medium flow off through line 13, and if desired, can be returned to line 3 by means of the blower 15. The heat exchangers of the condenser 4 and the evaporator 5 are connected with each other by lines 10, 11 and 12, and also connected to the cooling medium circuit, in which the compressor 8 is arranged. The cooling medium is compressed in the compressor 8, condensed in the condenser 4, and there gives its heat of evaporation to the regeneration medium. The cooling medium flows in the liquid state through line 11 to the expansion valve 9, and into the evaporator 5 where it is again evaporated and through the heat exchanger of the evaporator 5 receives the condensation heat of the regeneration medium. Difficulties arise due to the sharp increase of the vapor pressures of the coolant with temperature, if great temperature differences between condenser and evaporator by means of a heat-pump are to be generated.

Figure 2:
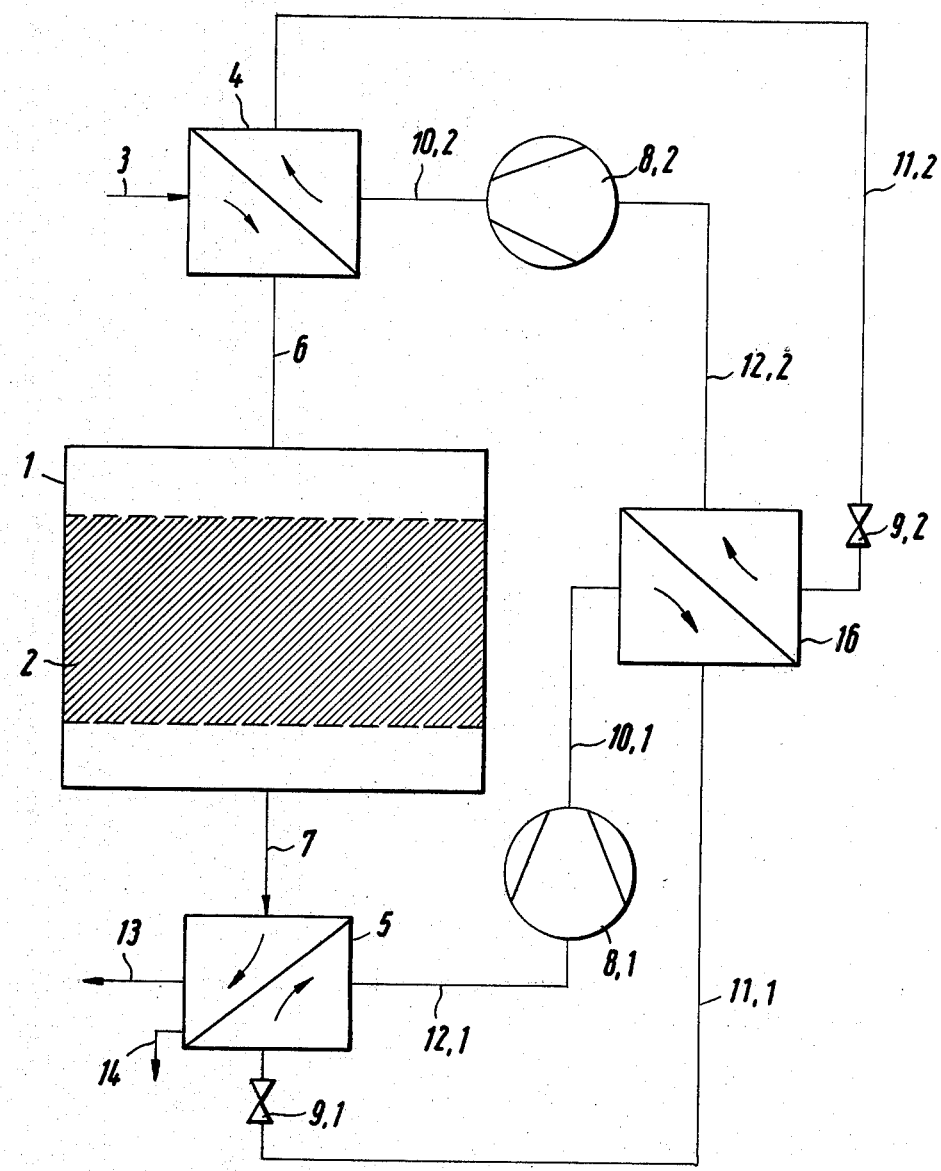
FIG. 2 shows a corresponding diagram of the method with a two-stage heat pump.

In such cases, the cascade arrangement, as shown in FIG. 2, of two or more heat-pump circuits has proven to be advantageous. The first heat-pump circuit accepts the sensible heat of the regeneration medium and the condensation heat of the desorbate in the heat exchanger 5. The therein evaporated coolant of this first heat-pump circuit is conducted through line 12.1 to the coolant compressor 8.1 and heated by the compression. The compressed, heated coolant is conducted through line 10.1 to the heat exchanger 16, in which it transfers its sensible heat and its heat of condensation to the coolant of the second heat pump circuit. The condensed coolant flows through line 11.1 to the expansion valve 9.1. The coolant vaporizes during the expansion and is cooled. The cold vapor flows back to the heat exchanger 9.1. The heat transport in the second heat pump circuit behaves correspondingly. The heat flow from the first heat-pump circuit transfered in the heat exchanger 16 heats the coolant of the second heat-pump circuit, which flows through the line 12.2 to the compressor 8.2. The coolant is condensed, and transfers its sensible heat and its heat of condensation, at least partly, to the regeneration medium for the thermal regeneration of the charged adsorption medium in condenser 4. In a cooled state, the cooling medium flows through line 11.2 to the expansion valve 9.2, where it is expanded and evaporated and thereby cooled. Cooled coolant—now in the form of vapor—is conducted to the heat exchanger 16.

In addition to the described compression heat pumps, ab- or adsorption heat pumps and heat-tubes can also be used. A very good utilization of the primary energy results when operating a compression heat-pump with a combustion engine drive. By the use of such a system for performing this method for the regeneration of charged adsorption materials by a combustion engine, a further surprising advantage is obtained. The exhaust gas of the combustion engine is poor in oxygen, and therefore by itself suitable as a regeneration medium in many cases. A safety margin results from the use of this exhaust gas, because the heating is necessarily connected with the generation of the protective gas.

Figure 3:
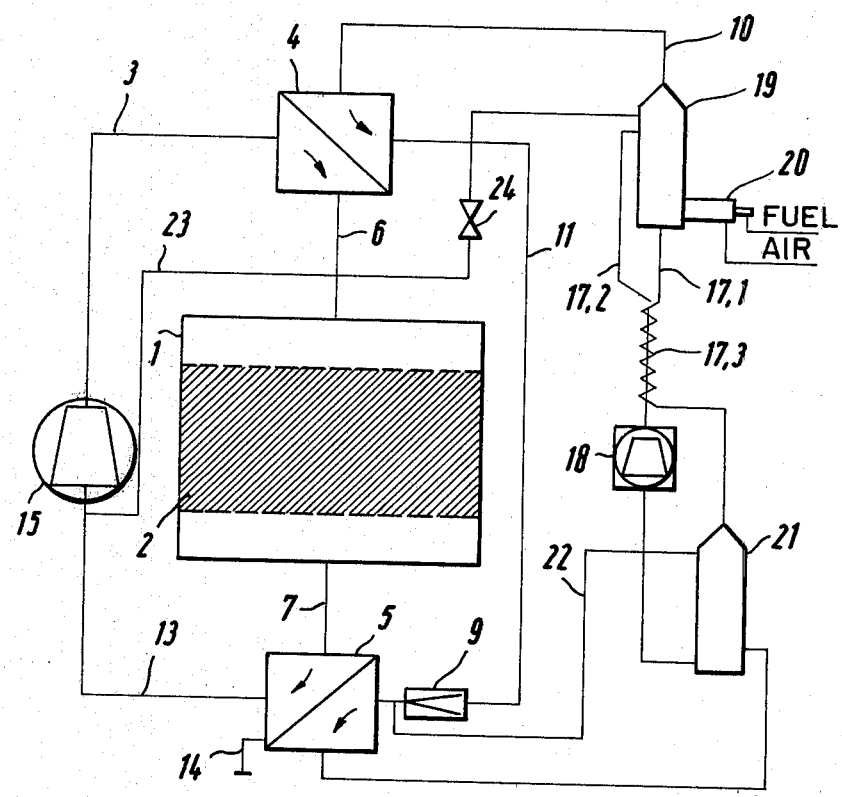
FIG. 3 diagrammatically illustrates the method of the invention with an adsorption heat pump.

In FIG. 3, 1 designates the container with the charged adsorption material before the regeneration, through which the regeneration medium in the gaseous state flows. The gaseous regenerating medium is impelled by the blower 15 to flow through lines 3, 6, 7 and 13 and through the heat exchangers of the condenser 4 for heating the gaseous regeneration medium, and of the evporator 5 for cooling the gaseous regeneration medium and for condensation of the desorbate. The sensible heat of the desorption medium, and the condensation heat of the desorbate are transfered to the coolant flowing through the heat exchanger of the evaporator 5, whereby the coolant accepts this heat as evaporation heat, and essentially gives it as latent heat to the absorber 21. The gaseous coolant from the heat exchanger of evaporator 5 is brought in contact in the absorber 21 with an absorption fluid which is a good solvent for the coolant. The pressure gradient generated by this solution process is the drive for the coolant flow. The absorption fluid, which is enriched with the coolant, flows, moved by the pumping device 18 to the expeller 19, in which it is heated by the heat of the combustion unit 20, and thereby gives off the dissolved coolant. The liberated coolant flows through line 10 to the condenser 4 where it is condensed and gives off its heat of condensation, which is transfered to the gaseous regeneration medium through the heat exchanger of the condenser 4. The condensed coolant is conducted through the line 11 to the throttling point 9. The liquid coolant passing through the throttling point 9, evaporates in the evaporator, and withdraws heat from its surroundings, which is transfered to it through the heat exchanger of the evaporator 5 from the gaseous desorption medium and from the condensation of the desorbate. At least part of the exhaust gas of the combustion unit 20 is fed through valve 24 and line 23 into the system of heat exchanger of the condenser 4- adsorption material container 1—heat exchanger of the evaporator 5—lines 3, 6, 7 and 13 and blower 15. In this manner the exhaust gas serves to drive out the air from this system. It can also be used as a gaseous regeneration medium. The cycle of the absorption liquid keeps the pump arrangement operating. Any kind of pump which will satisfactorily move the absorption liquid can be used in this pump arrangement. To make the cycle of the absorption liquid possible, the cold side of the coolant circuit is filled with an inert gas which has little or no solubility in the absorption liquid. The line 22 then serves to equalize the pressure. To improve the energy utilization, a heat exchanger 17.3 is provided in which the sensible heat of the hot absorption liquid in the back-flow of expeller 19 is transfered to the cold absorption liquid in the forward flow. In a suitable design, the absorption liquid which was cooled in the heat exchanger 17.3 can flow directly to the absorber 21 and in it make contact with the cooling medium.

Figure 4:
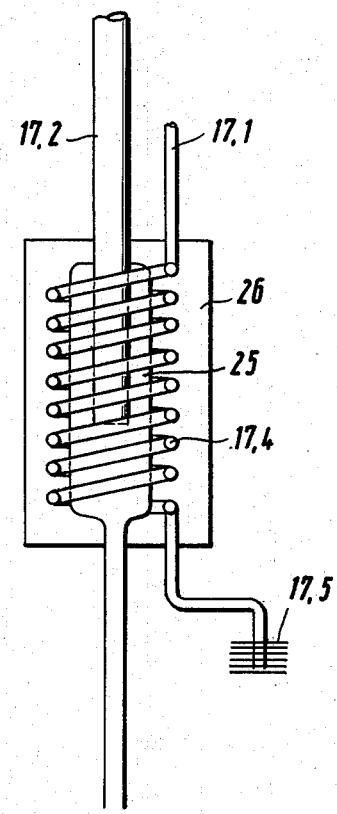
FIG. 4 illustrates a vapor bubble pump which may be used in the adsorption heat pump system.

FIG. 4 shows a special construction form of the pump device 18, i.e. as a bubble pump 26. Here, the absorption liquid in which coolant is dissolved, is heated in a bubble-forming vessel 25 by the hot absorption liquid which flows back from the expeller 19 through the pipe line 17.1 and is conducted through the coiled tube of the heat exchanger 17.4. A partial desorption takes place in vessel 25, and the liberated vapor of coolant lifts the not completely de-gassed absorption liquid through the riser line 17.2 into the expeller 19 (FIG. 3) which is heated by the combustion unit. The hot- and now coolant free-absorption liquid flows from the expeller 19 back to the tube coil of the heat exchanger 17.4, and from there continues to flow, in some cases through a heat exchanger 17.5 finally to the absorber 21 (FIG. 3).

Figure 5:
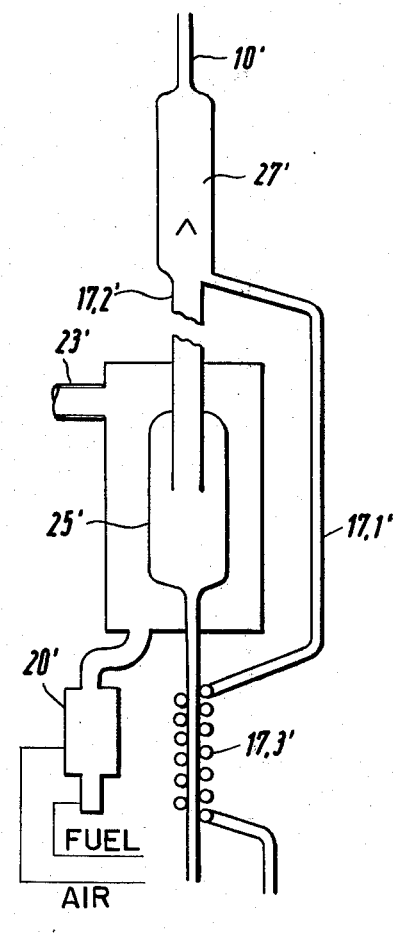
FIG. 5 illustrates a form of a vapor bubble pump which is used as an expeller.

In FIG. 5, a further advantageous construction form of the bubble pump 26 is shown employing direct heating means by a combustion unit. The bubble-forming vessel 25' is heated with the aid of the combustion device 20'. The exhaust gas of the combustion unit 20' flows through line 23' and valve 24 (FIG. 3). The coolant vapor is separated from the absorption liquid in the separating vessel 27' into which the absorption liquid is lifted through the riser line 17.2' by the influence of the coolant bubbles formed in the bubble-forming vessel 25'. A baffle prevents liquid droplets carried by the coolant vapor from entering line 10' which leads to the condenser 4 (FIG. 3). The back-flow line 17.1' leads to the heat exchanger 17.3', in which the coolant-containing absorption liquid, flowing to the bubble forming vessel 25' which serves as expeller is preheated.

Figure 6:
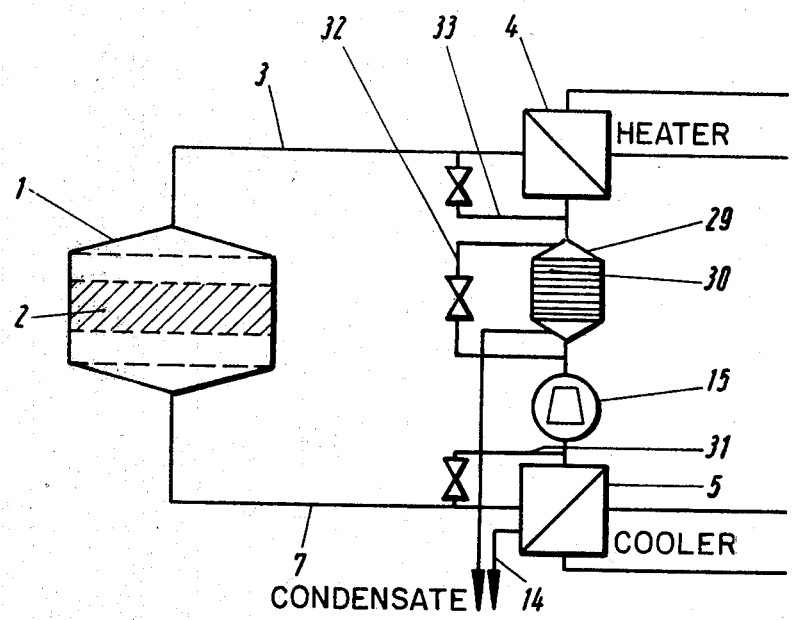
FIG. 6 illustrates the method of the invention with a heat accumulator for storing energy.

In FIG. 6 the adsorption material container 1 contains the adsorption material 2 which is to be regenerated. The adsorption material container may be the container in which the adsorption material was charged or the adsorption material may be placed in another container. This adsorption material container 1 is connected through pipe lines 3 and 7 with the structural elements condenser 5, a blower 15, heat accumulator 29, and heat exchanger 4, to the desorption circuit in which the gaseous desorption medium is transported by the blower 15 in a circuit. The heat exchanger 4 is provided with connections for the heating means which effect the heating of the gaseous desorption medium. In analogous manner, the condenser 5 is provided with connections for the coolant, which effects the cooling required for the condensation, and thereby, for the separation of the desorbate. The condenser 5 has a connection 14 for draining the separated condensate. In the same manner, the heat accumulator 29 is provided with a connection for withdrawing condensate generated there. The adsorption material 2 in the adsorption material container 1 is preferably in the form of a poured-on layer. Other arrangements may also be employed in the operation of the method in accordance with the invention. The heat storage substance 30 in the heat accumulator 29 is also preferably arranged as poured-on layer and here also other arrangements may be employed. A material with high specific heat and high density is advantageous as the material for the heat storage.

A by-pass 31 which is arranged in parallel to condenser 5 is advantageous in preventing overheating of the condenser 5.

The by-pass 31 permits the hot, gaseous desorption medium which leaves the adsorption material container 1 during the cooling phase, to flow around the condenser 5. In the same way, an undesired heat loss can be prevented by a by-pass 32 around heat accumulator 29 and by a by-pass 33 parallel to the heat exchanger 4. Thus, the gaseous desorption medium which in the cooling phase flows out cold from the condenser 5, can by-pass the heat exchanger 4 which sometimes is still hot. Also by-pass 32 permits by-passing the heat accumulator 29.

For desorption of a charged adsorption material 2 which has been placed in the adsorption material container 1, after filling the volume of the desorption circuit, including its structural elements and the pipe lines connecting the latter, with the gaseous desorption medium the blower 15 is started and the heating means of the heat exchanger 4 are turned on. The gaseous desorption medium is heated in the heat exchanger 4, flows hot to the adsorption material container 1, and permeates the charged adsorption material 2 contained in it. Thereby, the adsorption material 2 is heated with a temperature front progressing in the flow direction, and is desorbed during the heating process. The gaseous desorption medium is cooled by the heat transfer in heating the adsorption material, and by the desorption process itself, and leaves the adsorption material container 1 in a cooled state together with the driven-out desorbate. As the desorption progresses, the temperature front travels through the whole adsorption material layer 2, and the gaseous desorption medium, in the limiting case after completed desorption, leaves the adsorption material 2 at about the same temperature as it enters. A small difference between entering- and exit temperature, which in practice is not precisely zero, can be considered as an indication of the end of the desorption process. The desorbate formed during the desorption condenses in places having a sufficiently low temperature. This condensation can occur in the heat accumulator 29 whose stored heat was transferred to the adsorption material 2 during the beginning of the desorption phase, and whose heat storing substance 30 is cooled thereby. The produced condensate is conducted through the condensate drain to an external source, and may be treated in known manner. It is advantageous to connect the condenser 5 in the circuit, which is provided with connections for cooling, in which the temperature of the gaseous coolant is lowered, until it is below the condensation point of the desorbate. The condensate produced thereby is led to the outside through the condensate drain 14, and this condensate may also be subjected to known treatment. The gaseous desorption medium leaves the condenser 5, flows to the heat accumulator 29, and extracts further heat energy from its heat storage substance 30, which supplied heat to the gaseous desorption medium at the beginning of the desorption phase, and thereby became cooler. The result is that the heat accumulator 29 is thoroughly cooled. After the end of the desorption, the cooling phase begins; the adsorption material 2 is hot, the heat storage substance 30 is cooled. The gaseous desorption medium is heated in the adsorption material container 1, and flows—with the cooling of the condenser 5 shut off—essentially uncooled, to the heat accumulator 29, whose heat storage substance 30 is cooling while heating the gaseous desorption medium. Thereby, a temperature front travels through the heat storage substance 30, and the gaseous desorption medium leaves the heat accumulator 29, essentially at a temperature corresponding to the cooled heat accumulator substance 30. During this cooling phase the heating means of the heat exchanger 4 is turned off, and the cold gaseous desorption medium flows unheated to the adsorption material container 1. The heat stored in the heat accumulator 29 is available for approximately 1 hour if a renewed desorption is initiated.

As this example of the method shows, it is possible with this method, especially when using the prefered construction form with a pour-on layer of a heat storing material in the heat accumulator, to save approximately 60% of the desorption energy which must be supplied from an external source (heat for heating and desorption heat).

There is claimed:

1. Method for the thermal regeneration of solid adsorption materials charged with adsorbed impurities which comprises passing a heated gaseous regeneration medium through the charged adsorption material to expel the impurities principally of an organic nature therefrom and discharging regeneration medium containing desorbate from the adsorption material, maintaining a heat pump in which a cooling medium flows in a cooling medium circuit by propelling means which directs said medium in heated condition to a condenser, disposed out of direct contact with said adsorption material, of a first heat exchange of the heat pump wherein the medium is cooled and gives off heat, and the cooled medium then flows to a vaporizer of a second heat exchanger of the heat pump wherein the medium expands and extracts heat, and returning the medium to the propelling means, heating the regeneration medium prior to entrance to the adsorption material by passing it through said first heat exchanger of the heat pump in indirect heat exchange with the cooling medium in said condenser, and cooling said discharged regeneration medium containing desorbate by passing it through said second heat exchanger in indirect heat exchange with the cooling medium in said vaporizer.

2. Method according to claim 1, wherein said impelling means is a compression pump driven by a combustion engine, wherein at least a part of the exhaust gases of the combustion engine is used as regeneration medium and wherein at least a part of the exhaust gas of the combustion engine is introduced as a protective gas for displacing air in the system of enclosed adsorption material, first heat exchanger, second heat exchanger and connecting pipes.

3. Method according to claim 1, or claim 2, wherein a plurality of heat pump circuits with different cooling media are provided, in a cascade arrangement whereby the heat of one heat pump circuit is transferred to a heat exchanger which is common to both circuits, and one side of said heat exchanger acts as a condenser of the first heat pump circuit and its second side acts as the evaporator of the second heat pump circuit.

4. Method according to claim 1, wherein said impelling means is an absorber to absorb cooling medium, a pump to direct the absorbant containing cooling medium to an expeller heated by a combustion device to expel the cooling medium and direct it to the condenser, and wherein exhaust gas from said combustion device is, at least partly, used as regeneration medium.

5. Method according to claim 4, wherein at least a part of the exhaust gas of said combustion device is introduced as a protective gas for displacing air in the system of enclosed adsorption material, first heat exchanger, second heat exchanger, and connecting pipes.

6. Method according to claim 4, wherein said pump is a vapor bubble pump and wherein said vapor bubble pump has a bubble-forming vessel which operates as an expeller heated with a combustion device and wherein adsorption liquid from the expeller flows back through a line to the adsorber and wherein said vapor bubble pump has a bubble forming vessel which has wound around it said line carrying hot adsorption liquid to transfer some of its sensible heat to the liquid contents of the bubble forming vessel to form vapor bubbles which rise upward and keep the circulation of the adsorption liquid circulating.

7. Method according to claim 6, wherein the absorption liquid after separation of cooling medium is cooled by indirect heat exchange with incoming cold absorption liquid containing cooling medium and the cooled absorption liquid directly conducted to the absorber.

8. Method according to claim 1, wherein said regeneration medium containing desorbate from the adsorption material flows into an initially cold heat-accumulator containing a heat storage material, disposed outside the adsorption material container, to transfer sensible and latent heat to the heat storage material and thereby heat the latter, cooled gaseous regeneration material from the heat-accumulator is heated in said first heat exchanger and returned to said adsorption material, passage of the regeneration medium to the adsorption medium continues until substantial cooling of the regeneration medium by the adsorption medium does not occur and the uncooled, hot regeneration medium flowing to the heat-accumulator heats the storage material by transferring essentially sensible heat, the cooled regeneration medium from the heat-accumulator is conducted without further heating as previously, to the absorption material which it cools, the thus heated regeneration medium is returned to the heat accumulator for further transfer of heat thereto; the heat stored in the heat accumulator effects at least the first heating of the adsorption material for initiating the next desorption by passing the regeneration medium through the heat accumulator containing stored heat prior to contact with the adsorption medium.

9. Method according to claim 8, wherein the heat capacity of the heat accumulator is at least equal to the heat capacity of the remaining masses in the desorption circuit.

10. Method according to claim 8, or claim 9, wherein during the desorption phase the gaseous regeneration medium which leaves the adsorption material container together with the expelled desorbate, is cooled in a condenser in the second heat exchanger which is arranged between the adsorption material container, and the heat accumulator and wherein condensate formed in the condenser and the heat accumulator is discharged therefrom.

11. Method according to claim 1, wherein a heat accumulator is arranged in the desorption circuit before the first heat exchanger.

12. Method according to claim 11, wherein the heat accumulator is constructed as a container with a poured-on layer which essentially forms the heat storage substance.

13. Method according to claim 11, or claim 12, wherein a condenser of the second heat exchanger is arranged between the adsorption material container and the heat accumulator.

14. Method according to claim 11, or claim 12, wherein a by-pass which can be cut-off is provided parallel to the heat accumulator.

15. Method according to claim 11, or claim 12, wherein a by-pass which can be cut-off is provided parallel to the first heat exchanger.

16. Method according to claim 11, or claim 12, wherein a condenser of the second heat exchanger is arranged between the absorption material container and the heat accumulator, and wherein a by-pass which can be cut off, is provided parallel to said condenser.

* * * * *